US005552991A

United States Patent [19]
Lee et al.

[11] Patent Number: 5,552,991
[45] Date of Patent: Sep. 3, 1996

[54] CONTROL SYSTEM FOR AN ELECTRONIC PASTAGE METER HAVING A PROGRAMMABLE APPLICATION SPECIFIC INTERGRATED CIRCUIT

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 163,629

[22] Filed: Dec. 9, 1993

[51] Int. Cl.[6] ............................... G05B 11/01; G06F 9/00
[52] U.S. Cl. .................... 364/464.02; 364/130; 364/140; 364/918.52; 395/775
[58] Field of Search ...................................... 395/481, 775, 395/497.01, 775; 364/464.02, 918.52, 130, 140

[56] References Cited

U.S. PATENT DOCUMENTS

| | | | |
|---|---|---|---|
| 4,638,452 | 1/1987 | Schultz et al. | 364/900 |
| 4,644,498 | 2/1987 | Bedard et al. | 364/900 |
| 4,816,823 | 3/1989 | Polkinghorne et al. | 340/825.15 |
| 5,097,437 | 3/1992 | Larson | 395/775 |
| 5,121,327 | 6/1992 | Salazar | 364/464.02 |
| 5,263,139 | 11/1993 | Testa et al. | 395/307 |
| 5,267,172 | 11/1993 | Vermesse | 364/464.02 |
| 5,396,599 | 3/1995 | Cobbs et al. | 395/280 |
| 5,418,924 | 5/1995 | Dresser | 395/494 |
| 5,420,995 | 5/1995 | Taguri | 395/421.01 |
| 5,438,519 | 8/1995 | DiGiulio | 364/464.02 |

FOREIGN PATENT DOCUMENTS

| | | | |
|---|---|---|---|
| 0359235A2 | 3/1990 | European Pat. Off. | G06F 12/06 |
| 0464778A1 | 1/1992 | European Pat. Off. | G07B 17/02 |

OTHER PUBLICATIONS

Electronics & Wireless World, vol. 94, No. 1624, Feb. 1988, Surrey GB pp. 129–130 'VMEbus eprom board'.
Elektronik, vol. 40, No. 16, Aug. 6, 1991, Munchen de pp. 47–51. p. 48, left col., line 6–right col., line 2; p. 49, left col., line 17–line 28; and FIG. 1.

Primary Examiner—Tod R. Swann
Assistant Examiner—Tuan V. Thai
Attorney, Agent, or Firm—Charles G. Parks, Jr.; Melvin J. Scolnick; Angelo N. Chaclas

[57] ABSTRACT

The electronic postage meter includes a printing unit which is responsive to a plurality of motors for printing of a postage indicia in response to a control circuit. The control circuit is comprised of a programmable microprocessor in bus communication with an accounting medium having memory units for accounting for the postage printed by the printing unit responsive to the programming of the microprocessor. An integrated circuit includes an address decoding module for generating a unique combination of ASIC control signals in response to a respective address placed on the bus by the microprocessor. A timer register is responsive to ones of the control signals from the address decoding module to enable writing of the timer data into the timer registers by the microprocessor. The timer unit is responsive to the timer data for generating one of a plurality of timing signals in accordance with timer data. Also included are a plurality of non-volatile memory units. The non-volatile memory unit responsive to other ones of the control signals from the address decoding module to enable the non-volatile memory units for writing data into the non-volatile memory unit by the microprocessor. The integrated circuit further includes a non-volatile memory access timer unit for causing the control signal from the address decoding module enabling the non-volatile memory units to stay active for a predetermined time of the non-volatile memory access timer.

3 Claims, 5 Drawing Sheets

CONTROL SYSTEM FOR AN ELECTRONIC PASTAGE METER HAVING A PROGRAMMABLE APPLICATION SPECIFIC INTERGRATED CIRCUIT

RELATED APPLICATIONS

The following co-pending applications are commonly assigned to Pitney Bowes Inc. and have been concurrently filed, U.S. patent application Ser. No. 08/163,627, entitled MULTIPLE PULSE WIDTH MODULATION CIRCUIT, filed on Dec. 9, 1993; U.S. Pat. No. 5,475,621, entitled DUAL MODE TIMER-COUNTER, issued on Dec. 12, 1995; U.S. Pat. No. 5,471,608, entitled DYNAMICALLY PROGRAMMABLE TIMER-COUNTER, issued on Nov. 28, 1995; U.S. Pat. No. 5,377,264, entitled MEMORY ACCESS PROTECTION CIRCUIT WITH ENCRYPTION KEY, issued on Dec. 27, 1994; U.S. patent application Ser. No. 08/163,811, entitled MEMORY MONITORING CIRCUIT FOR DETECTING UNAUTHORIZED MEMORY ACCESS, filed on Dec. 9, 1993; U.S. patent application Ser. No. 08/163,771, entitled MULTI-MEMORY ACCESS LIMITING CIRCUIT FOR A MULTI-MEMORY DEVICE, filed on Dec. 9, 1993; U.S. patent application Ser. No. 08/163, 790, entitled ADDRESS DECODER WITH MEMORY ALLOCATION FOR A MICRO-CONTROLLER SYSTEM, filed on Dec. 9, 1993; U.S. patent application Ser. No. 08/163,810, entitled INTERRUPT CONTROLLER FOR AN INTEGRATED CIRCUIT, filed on Dec. 9, 1993; U.S. patent application Ser. No. 08/163,812, entitled ADDRESS DECODER WITH MEMORY WAIT STATE CIRCUIT, filed on Dec. 9, 1993; U.S. patent application Ser. No. 08/163,813, entitled ADDRESS DECODER WITH MEMORY ALLOCATION AND ILLEGAL ADDRESS DETECTION FOR A MICROCONTROLLER SYSTEM, filed on Dec. 9, 1993 and U.S. Pat. No. 5,483,458, entitled PROGRAMMABLE CLOCK MODULE FOR POSTAGE METERING CONTROL SYSTEM, issued on Jan. 9, 1996.

BACKGROUND OF THE INVENTION

The present invention relates to electronic postage metering systems, and like systems, having a microprocessor control system utilizing a programmable microprocessor in bus communication with an application specific integrated circuit and a plurality of memory.

A microprocessor control system is conventionally utilized in an electronic postage meter (EPM) to control such system functions as printing, accounting, envelope feeding and interface operation of the meter. The degree of control system complexity varies depending on the EPM model under control. For example, the Pitney Bowes Model 6900 series EPMs are a hand-feed stand-alone meter with a very limited feature set, while the Pitney Bowes model 6500 series meter is a high-throughput metering system which can be interfaced with scales and automatic envelope feeding devices. Because of the variation of system control requirements, it has been conventional to develop a unique microprocessor control system for each meter model. It should be noted that the variance between system is not only a matter of size and functionality but, also, architecture. For example, the Model 6900 series meters utilize fiat bed printing techniques while the Model 6500 series meters utilize rotary drum printing techniques. Another printing technique known suitable for use in postage meters is thermal printing techniques.

As a result, it is customary for each meter model to have a unique control system incorporating different microprocessors, different ASICs, different memory devices and a variety of other electrical components. It should be appreciated that the principle cost and time factor is in developing, testing and qualifying the various ASICs.

SUMMARY OF THE INVENTION

It is an object of the present invention to present an ASIC having a programmable module such that a single ASIC is suitable for utilization among a number of postage meter models for a application.

It is a still further objective of the present invention to present an ASIC having registers for receiving parameter data from a programmable microprocessor whereby the respective modules of the ASIC are re-configurable in accordance with the parameter data such that a single ASIC is suitable for utilization among a number of postage metering system having various functionality sets.

The control system for a EPM is comprised of a programmable microprocessor in bus communication with a plurality of non-volatile memory units for accounting for the postage printed by a printing unit responsive to the programming of the microprocessor. The programmable microprocessor is also in bus communication with a ROM or program memory and a random access memory (RAM), and an application specific integrated circuit (ASIC). The ASIC is comprised of a number of system modules, e.g., microprocessor interface module, address decoder module, interrupt controller module, clock module, timer module, non-volatile memory security module, printer module, communication module, printhead controller module, graphical interface module and CCD interface module.

The ASIC also includes a plurality of addressable registers which, upon system power-up as part of the system initilization procedure, are accessed by the microprocessor and into which the various operating parameters for each module is written. Also during this procedure, the microprocessor writes data to certain ones of the ASIC registers which set certain operating mode states for internal ASIC functions. For example, the microprocessor can be programmed to set one of the ASIC registers to establish the system clock frequency of the ASIC to match that required by the microprocessor.

The programmability of the ASIC in this manner allows the ASIC to be re-configured under software control for the particular postage metering system. This and other advantages of the present invention will be apparent from the subsequent detailed description of the preferred embodiment.

DETAILED DESCRIPTION OF THE PREFERRED EMBODIMENT

Figure 1:
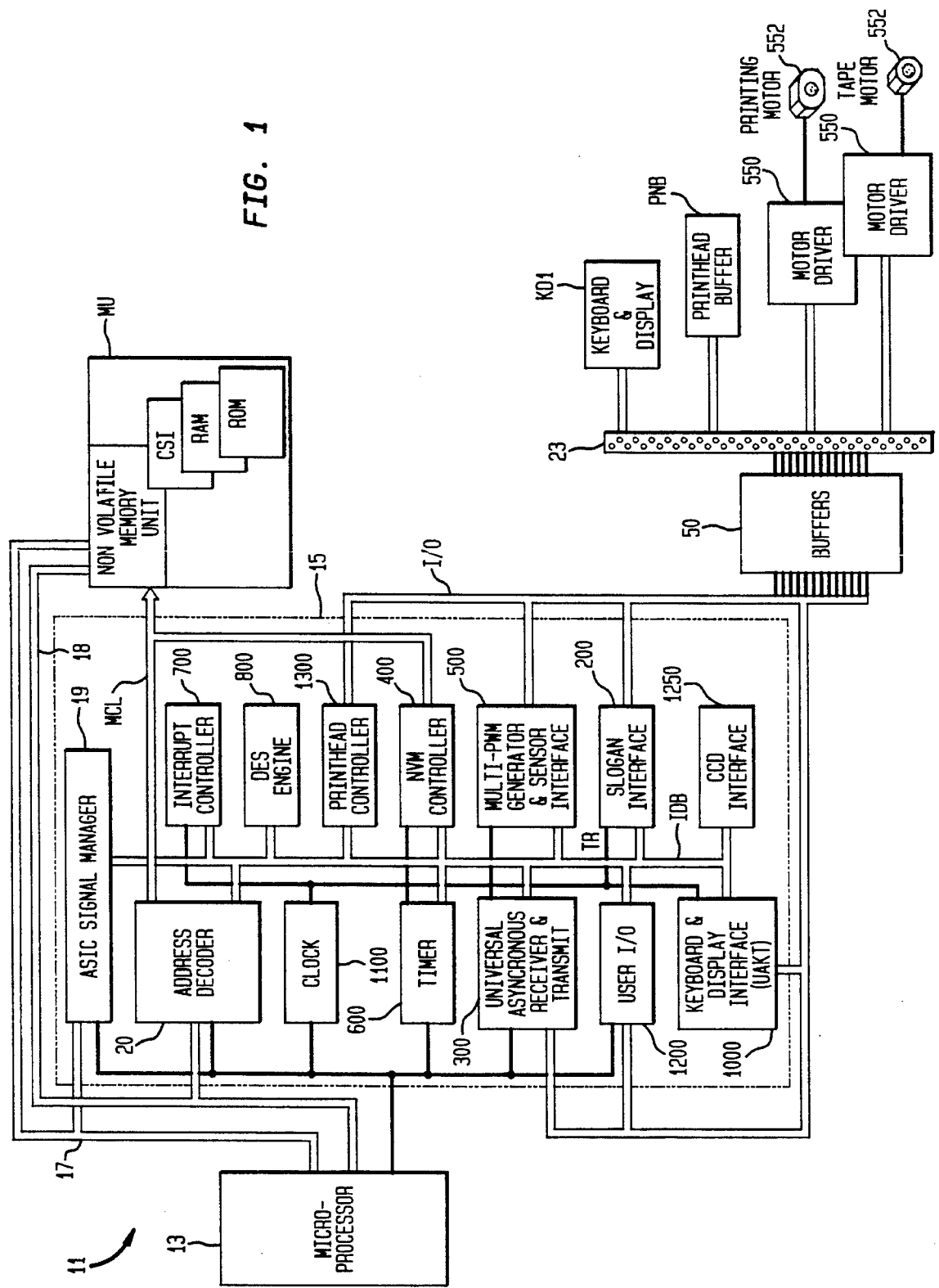
FIG. 1 is a schematic of a microcontroller system for a thermal printing EPM in accordance with the present invention.

Referring to FIG. 1, a microprocessor control system, generally indicated as 11, which is preferably intended to control a family of thermal printing and ink jet postage meter (not shown), is comprised of a microprocessor 13 in data bus 17 and address bus 18 communication with an application specific integrated circuit (ASIC) 15 and a plurality of memory units (MU). The ASIC 15 is comprised of a number of integrated circuits, for example, ASIC signal manager 19, address decoder 20, clock 1100, timer module 600, UART module 300, user I/O 1200, keyboard and display interface 1000, interrupt control 700, encryption and decryption engine 800, memory controller 400, multi-PWM generator and sensor interface 500 and a slogan interface 200 and CCD interface 1250. It should be appreciated that it is within the contemplation of the present invention that the integrated circuit modules which make up the ASIC 15 may vary and the modules here identified are intended to illustrate the preferred embodiment of the invention.

The ASIC has an internal data bus (IDB) and a plurality of control lines (CL), one group of which control lines are module interrupt lines (IR). Certain of the modules are in communication with a buffer 50 via I/O lines. The buffer 50 is in communication with a coupler 23. The coupler 23 is in communication with various meter devices, such as, the keyboard display (KDI), printhead buffer (PHB) and motor drivers 550 which drive respective motors 552. In FIG. 1, the bus lines IDB, control lines IR and CL and I/O lines are depicted in simplified manner for the purpose of clarity.

Figure 2:
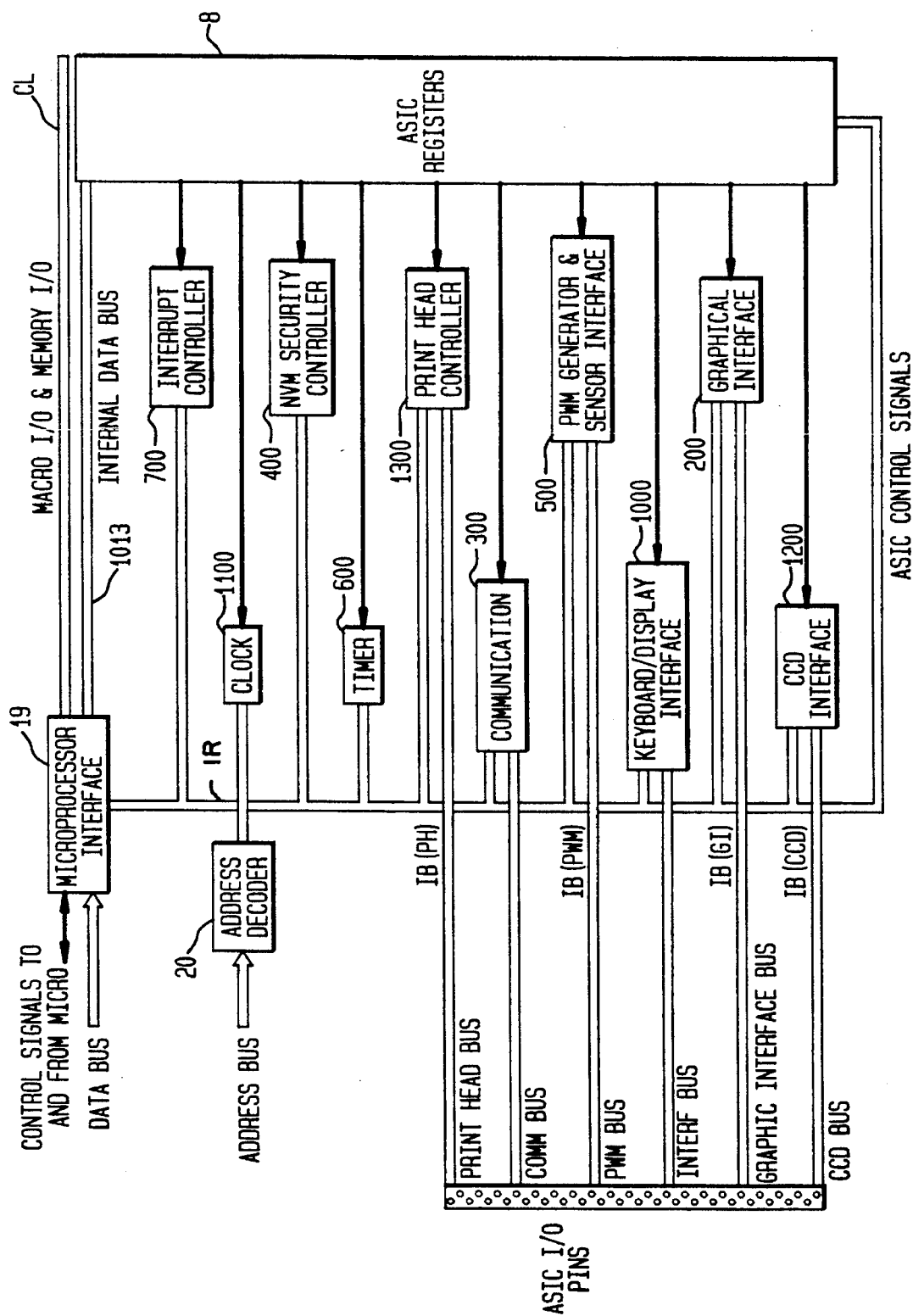
FIG. 2 is a schematic of a programmable ASIC in accordance with the present invention.

Referring to FIGS. 1 and 2, the microprocessor 13, in the preferred embodiment, is a Motorola Model MC68EC000 which passes the control signals set forth in Table 1 between the microprocessor 13 and the microprocessor interface circuit 19 of the ASIC along the I/O bus CL.

TABLE 1

| Asynchronous Bus Control | |
|---|---|
| AS | Address Strobe |
| R/W | Read/Write Signal |
| UDS | Upper Data Strobe |
| LDS | Low Data Strobe |
| DTACK | Data Transfer Acknowledge |
| Interrupt control | |
| IPL0, IPL1, LPL2 | Interrupt Priority Level |
| Processor Status Controls | |
| FC0, FC1 & FC2 | Function Codes |
| System Control | |
| BERR | Bus Error |
| RESET | Reset |

The control system address bus is received by the ASIC address decoder 20 which generates the necessary control signal on the internal ASIC control bus IR for enabling the respective modules in accordance with the address instruction from the microprocessor 13. Low order data from the system data bus 17 is received by the interface 19 and placed on the internal data bus of the ASIC to be placed in the ASIC registers 8, when enabled by the address decoder. The address enables writing into the ASIC registers 8 in response to an address instruction from the microprocessor. The data placed in the ASIC registers 8 are the operating parameters or mode selection data for the respective modules to be accessed by the respective module when the respective module has been enabled by the address decoder 20.

Figure 3:
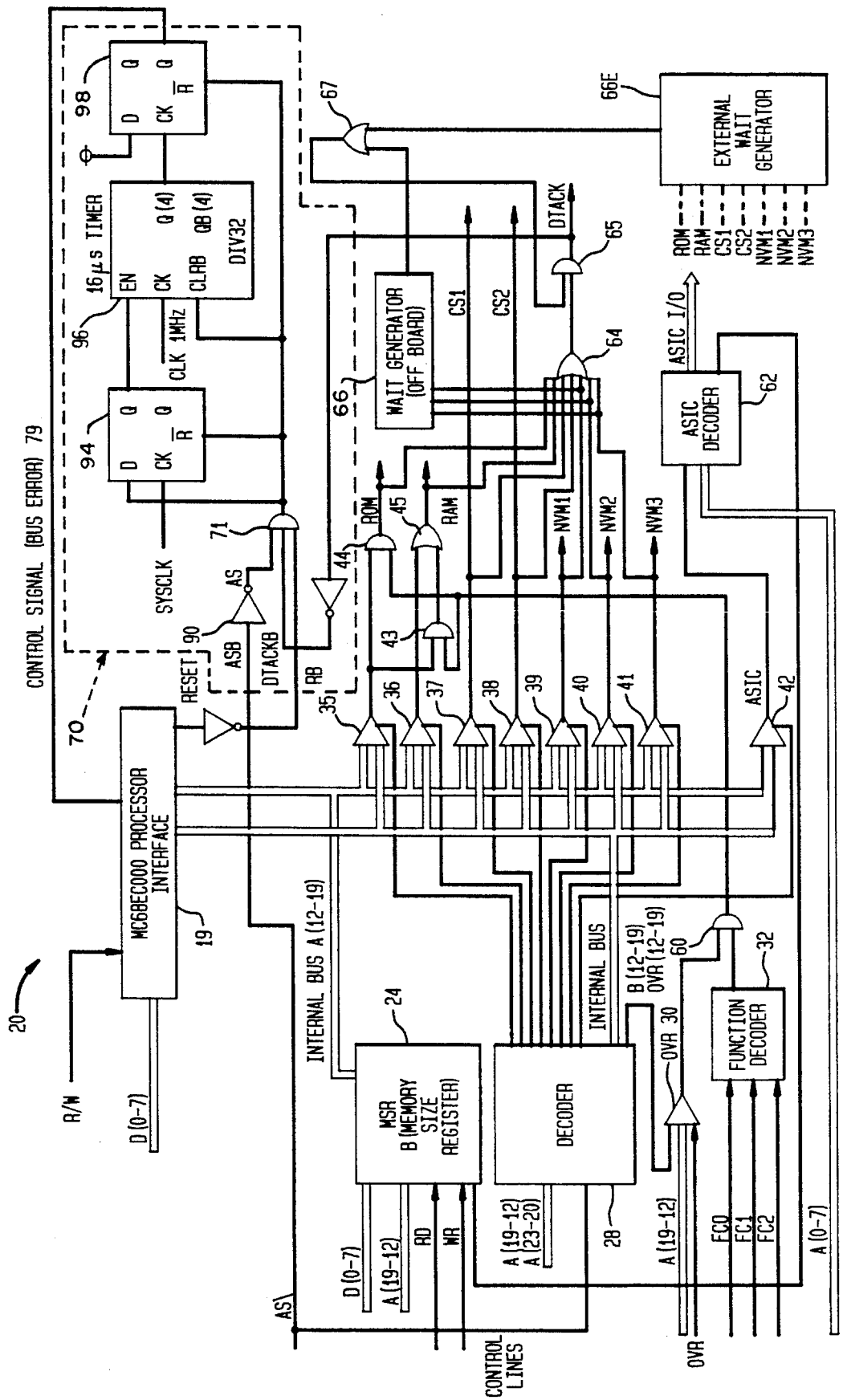
FIG. 3 is a schematic of an address decoding system for the programmable ASIC in accordance with the present invention.

Referring to FIG. 3, in order to configure the ASIC 15 for a particular meter control system application, it will be necessary to set the address decoder 20 relative to the addressable space of the memory units forming part of the system. The address strobe (AS) output from the microprocessor 13 is directed to a memory decoder section 28 and through inserter 90 to an AND gate 71 associated with the illegal address detection circuit 70 of the system. The decoder 28 also communicates with the address bus 17 (address bus lines 23–20, 19–12) to receive 12-bit address information from the microprocessor 13. Also provided is a memory over-write comparator circuit (OVR) 30 and function decoder unit 32.

The output from the memory size register 24 is carried by the 8-bit internal bus "A" and the output from the decoder 28 is carried by the 8 bit-internal bus "B". The respective input to each of a plurality of comparators 35 through 42 is in communication with internal bus A and internal bus B. The output of comparator 35 is directed to AND gates 43 and 44 and the output of comparator 36 is directed to an OR gate 45. The output from comparator 44 is internally directed to the ROM pin 46 of the ASIC. The output of the OR gate 45 is internally directed to the RAM RAM line of the ASIC. The output from comparators 37 and 38 are respectively directed internally to ASIC lines C51 and C52, and are intended to provide a memory write-enable signal for external devices which may be connected to the control system. The output of comparators 39, 40 and 41 is respectively directed internally to the chip select lines NVM1, NVM2 and NVM3.

A control signal OVR, from the microcontroller, is directed to the input side of the overlay comparator chip 30 and enables accessing of the memory size supplied from the decoder 28 of the memory overlay block. The function of ROM-RAM enabled is to designate whether the operating program is in a data transfer or program fetch mode to enable by the microprocessor to utilize the same address range depending on the state of control signals "FC0", "FC1" and "FC2". The control signals "FC0", "FC1" and "FC2" are directed, from the microcontroller, to the input side of a function decoder 32. The output from the overlay comparator circuit 30 and the function decoder 32 is directed to AND gate 60 which has an output directed to the inverse input of gate 44 and input of gate 43. The output of comparator 42 is directed to the input of an ASIC decoder 62. The output of the ASIC decoder 62 is used for providing internal addressing of the ASIC 15. A control output of the ASIC 62 is directed to the MSR 24 which enables the memory size registers for writing during system power-up.

Referring again to the comparators 37 through 41, gates 44 and 45, the output from each of them is also directed to an OR gate 64 which has an output designated "DTACK" when any of the comparators output goes active. Also the output from each comparator 39, 40 and 41 is directed to a Wait Generator 66. The output of the Wait Generator 66 is directed to the gate 67 and to the illegal address detector, generally indicated as 70. The Wait Generator 66 outputs, when active, delays the issuance of the DTACK signal for a programmed period of time and also suppresses the illegal address detector 70 for the same amount of time. The purpose of delaying the DTACK is based on the fact that the write time for external devices may be protracted. Therefore, to avoid that the microprocessor terminate the bus cycle, the issuing of the DTACK signal is delayed an appropriate amount of time.

An illegal address detection circuit, generally indicated as 70 is provided and includes a gate 71 which receives the Reset signal from the interface circuit 19, the address strobe (AS\) signal from the microprocessor and the DTACK signal from the gate 65. Therefore, if an address in an illegal range has been issued, there will not be a DTACK signal issued causing the output of the gate 70 to go active informing the processor interface 19 of a bus error. It should be appreciated that the processor interface 19 in combination with the subsequently described interrupt controller 700 is charged with communicating the proper interrupt to the microprocessor 13. A more detailed description is presented in U.S. patent application Ser. No. 08/163,790, titled "Address Decoder With Memory Allocation For A Micro-Controller System, commonly assigned (Atty. Doc. E-169).

Figure 4:
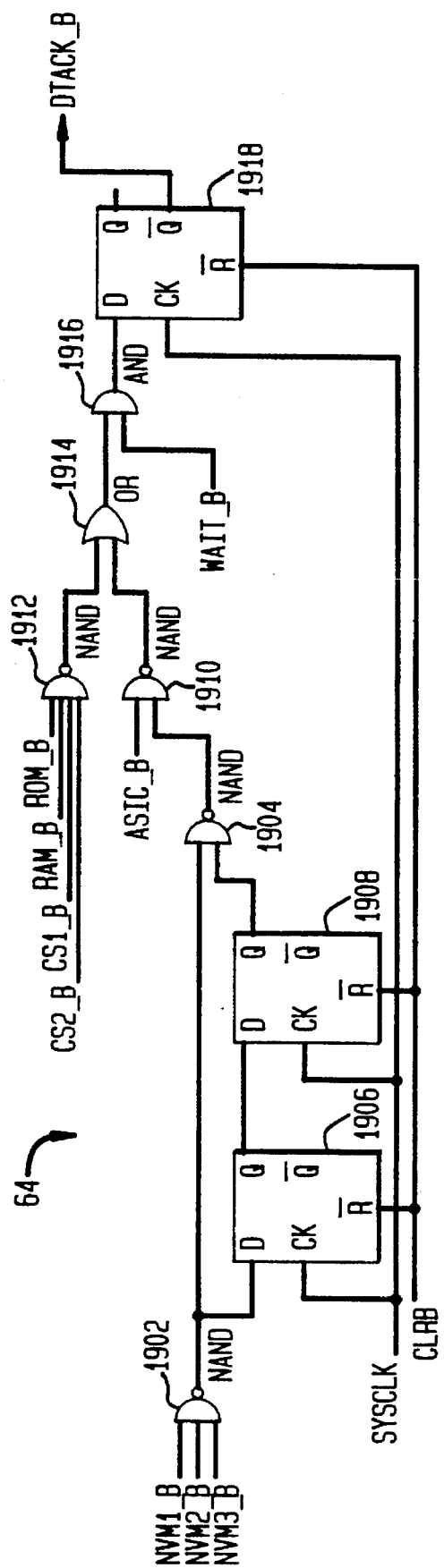
FIG. 4 is a schematic of non-volatile memory wait state generator in accordance with the present invention.

Referring to FIG. 4, as noted, the meter control system utilizes non-volatile memories to store critical account data. In order to accommodate different type of non-volatile memory which require varying data bus access time, the ASIC includes a dual wait state circuitry. The Wait Generator 66 is comprised of an NAND gate 1902 having the chip select signals NVM1, NVM2 and NVM3 as inputs. The output of the NAND gate 1902 is directed to the input of NAND 1904. The output from NAND gate 1902 is also directed to the data input to the flip-flop 1906. The system clock signal is also directed to the clock input of the flip-flop 1906. The system clock signal is also directed to the clock input of a flip-flop 1908. The data input to the flip-flop 1908 receives the high output from the flip-flop 1906. The high output from the flip-flop 1908 is directed to the other input of NAND gate 1904. It is observed that if either chip select signal NVM1_B, NVM2_B or NVM3_B (_B signals are active low) goes active the output from the NAND gate 1902 goes high. However, the presence of flip-flops 1096 and 1908 delays NAND gate 1904 from going active for a delay period sufficient to assure adequate time for a write to the non-volatile memories by delaying the issuance of the DTACK signal to the signal manager 19. The delay time is a function of the type and number of flip-flops 1906 and 1908 employed.

When NAND gate 1904 goes active, NAND gate 1910 goes active to cause OR gate 1914 to go active. When OR gate 1914 goes active AND gate 1916 goes active. The output of AND gate 1916 is directed to the data input of a flip-flop 1918 which result in the flip-flop 1918 to issue the DTACK signal. As earlier noted, the DTACK signal is also issued when either the CS1, CS2, RAM, ROM and ASIC chip select signals are active. When either the CS1, CS2, RAM or the ROM signal is active, NAND gate 1912 is active which brings OR 1914 active and causing the DTACK signal to be issued as afore described. It is noted that as afore noted, when the CS1 or CS2 goes active the DTACK signal is delayed unit the WAIT signal goes inactive. A more detailed description is presented in U.S. patent application Ser. No. 08/163,812, titled "ADDRESS DECODER WITH MEMORY WAIT STATE CIRCUIT, commonly assigned (Atty. Doc. E-174).

Figure 5:
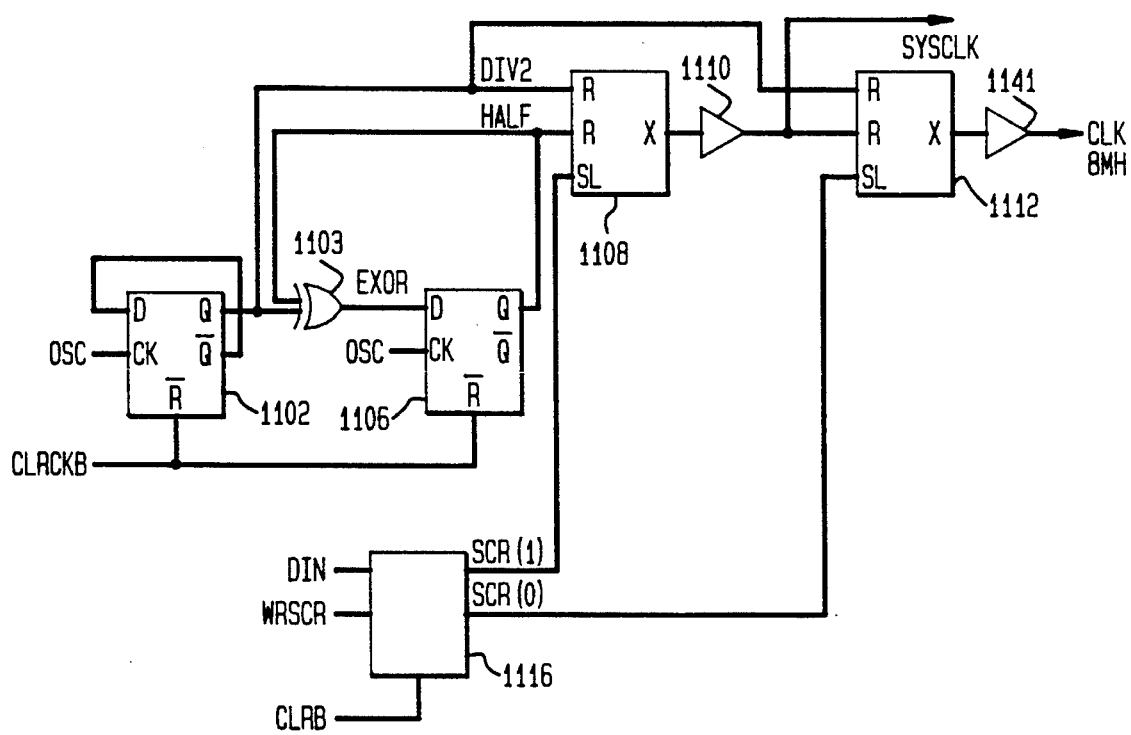
FIG. 5 is a schematic of a programmable system clock in accordance with the present invention.

Referring to FIG. 5, in order to match the ASIC system clock, the clock module 1100 is programmable, the clock module 1100 includes a first flip-flop 1102 having its high output directed to an XOR gate 1103. The low output of the flip-flop 1102 is directed back to the data input of that flip-flop. The system oscillator is directed to the clock input of flip-flop 1102. The high output from flip-flop 1102 is also directed to one input of a multiplex switch 1108 and a multiplex switch 1112. The output from the XOR gate 1103 is directed to the data input of a flip-flop 1106 which also receives the oscillating signal at its clock input. The high output from the flip-flop 1106 is directed to the other input of the XOR gate 1103 and the other input of the multiplex switch 1108. A clock reset is directed to the resets of both flip-flops 1102 and 1106.

The output from the multiplex switch 1108 is directed to a amplifier 1110 whose output is designated as system clock for the system clock use and is also directed to the other input of the multiplex switch 1112. The output multiplex switch 1112 is directed to an amplifier 1141 whose output is designated as the clock 8 megahertz. Included are a register 1116 having a data input, write input and a clear input. One of the outputs from the register 1116 is directed to the multiplex switch 1108 and the other output is directed to the multiplex switch 1112.

It is now observed that upon power-up of the system, the microprocessor causes a write to the registers 1116 and other registers of the ASIC registers 8 by addressing the address decoder module 20 which then write enables the register 1116 in a conventional manner. The microprocessor puts the appropriate data on the data lines for writing into the register 1116 in a customary manner. Depending on the data write, the output from the registers places the multiplex switches in the appropriate switching position to drive the clock frequencies set forth in Table 2 depending on the frequency of the oscillating crystal, as specifically indicated in Table 2.

TABLE 2

| CRYSTAL | SCR | | SYSCLK | CLK 8 MHz |
|---|---|---|---|---|
| | b0 | b1 | | |
| 32 MHz | 0 | 0 | 16 MHz | 16 MHz |
| | 0 | 1 | 8 MHz | 8 MHz |
| | 1 | 0 | 16 MHz | 8 MHz |
| | 1 | 1 | 8 MHz | 4 MHz |
| 16 MHz | 0 | 0 | 8 MHz | 8 MHz |
| | 0 | 1 | 4 MHz | 4 MHz |
| | 1 | 0 | 8 MHz | 4 MHz |
| | 1 | 1 | 4 MHz | 2 MHz |

Therefore, it is observed that with any given crystal frequency, one will achieve the clock frequencies indicated in Table 2 under the system clock column or the clock 8 MHz column. As a result, the system offers the advantage of allowing the ASIC to be utilized with larger systems by replacing the crystal with a 32 MHz crystal to receive 16 MHz and 4 MHz signals or utilizing a 16 MHz clock to get 8 MHz or 4 MHz clocking frequency combinations.

It should now be appreciated that the control parameters of a module may be set when the microprocessor writes to the ASIC registers. The above description represents the preferred embodiment and should not be viewed as limiting. The scope of the invention is presented in the appendix claims.

What is claimed is:

1. An improved control system for a postage meter having:

a programmable microprocessor, a bus for providing communication between a plurality of memory units and an integrated circuit, said programmable microprocessor having means for placing address data and operating data on said bus, said integrated circuit having an address decode module for generating module control signals, clock module for generating a system clock signal, a timer module for generating a timer signal and plurality of system control modules, each of said system control modules being electronically responsive to a select one of said module control signals, and said clock signals;

one of said memory units being a program memory having stored therein program data and others of said memory units being nonvolatile memory units and having stored therein operating data, said address decoding module having means for generating a unique combination of control signals in response to respective address data placed on said bus by said programmable microprocessor, said memory units being enabled for reading and writing of said operating data to and in said memory units is response to other respective ones of said module control signals from said address decoder module, wherein the improvement comprises:

said address decoder module to generate a respective one of said module control signals in response to a respective one of said address data placed on said bus by said programmable microprocessor, said integrated circuit having a plurality of registers for receiving said operating data placed on said bus by said programmable microprocessor in response to said respective one of said address data placed on said bus by said programmable microprocessor in response to ones of said ASIC control signals, said control modules to be enabled in response to select ones of said module control signals in response to a respective data address from said programmable microprocessor and to read said operating data from corresponding ones of said registers such that said control module generates control signals in accordance with said operating data.

2. An improved control system as claimed in claim 1 wherein said clock module having means to read said operating data from said plurality of said registers corresponding to said registers for receiving said operating data and generate a clock signal in accordance with said operating data.

3. An improved control system as claimed in claim 1 wherein said timer module having means to read said operating data from said plurality of said registers corresponding to said registers for receiving said operating data and generate a timer signal in accordance with said data.

* * * * *

UNITED STATES PATENT AND TRADEMARK OFFICE
CERTIFICATE OF CORRECTION

PATENT NO. : 5,552,991
DATED : September 3, 1996
INVENTOR(S) : Young W. Lee, et al.

It is certified that error appears in the above-indentified patent and that said Letters Patent is hereby corrected as shown below:

Title page, item [54], and col. 1,

In the title delete "CONTROL SYSTEM FOR AN ELECTRONIC PASTAGE METER HAVING A PROGRAMMABLE APPLICATION SPECIFIC INTERGRATED CIRCUIT" and insert --CONTROL SYSTEM FOR AN ELECTRONIC POSTAGE METER HAVING A PROGRAMMABLE APPLICATION SPECIFIC INTEGRATED CIRCUIT--.

Column 1 line 1 delete "CONTROL SYSTEM FOR AN ELECTRONIC PASTAGE METER HAVING A PROGRAMMABLE APPLICATION SPECIFIC INTERGRATED CIRCUIT" and insert --CONTROL SYSTEM FOR AN ELECTRONIC POSTAGE METER HAVING A PROGRAMMABLE APPLICATION SPECIFIC INTEGRATED CIRCUIT--.

Signed and Sealed this

Third Day of June, 1997

Attest:

BRUCE LEHMAN

*Attesting Officer*  *Commissioner of Patents and Trademarks*